United States Patent [19]

Rise

[11] 4,407,405
[45] Oct. 4, 1983

[54] WORK TRANSFER DEVICE

[75] Inventor: William E. Rise, Utica, Mich.

[73] Assignee: Android Corporation, Auburn Hts., Mich.

[21] Appl. No.: 280,386

[22] Filed: Jul. 6, 1981

[51] Int. Cl.³ .............................................. B65G 25/00
[52] U.S. Cl. ...................................................... 198/774
[58] Field of Search .................... 198/774, 621, 740

[56] References Cited

U.S. PATENT DOCUMENTS

| 3,135,395 | 6/1964 | Wallis | 198/621 |
| 3,430,782 | 3/1969 | Henkel | 198/621 |
| 4,311,429 | 1/1982 | Wallis | 198/621 |

Primary Examiner—Joseph E. Valenza
Assistant Examiner—Jonathan D. Holmes
Attorney, Agent, or Firm—Stephenson and Boller

[57] ABSTRACT

A work transfer device executes a generally rectilinear path of movement for progressively transferring articles between successive stations. Transverse vertical motion is imparted via a guide rod which is bodily transversely displaced while maintained parallel with the longitudinal travel of the carriage members. Slides are shiftable longitudinally on the guide rod. Vertical rods project from the slides through the carriage members to support a walking beam type transfer bar. The guide rod is displaced by a double bellcrank mechanism thereby imparting vertical transverse motion to the walking beam.

14 Claims, 7 Drawing Figures

WORK TRANSFER DEVICE

CROSS REFERENCE TO A RELATED APPLICATION

This application is related to the commonly assigned co-pending application entitled "Work Transfer Device" filed July 6, 1981 and having Ser. No. 280,385.

BACKGROUND AND SUMMARY OF THE INVENTION

This invention relates generally to work transfer devices and is more specifically concerned with a work transfer device of the type which repeatedly executes an operating cycle of motion in a closed, generally rectilinear path to progressively advance workpieces from station to station.

In automation machining it is a conventional practice to position a plurality of machine tools in a series path and to progressively move workpieces along this path for machining operations. One type of work transfer device for progressively advancing workpieces repeatedly executes an operating cycle consisting of motion in a closed, generally rectilinear path. This type of device generates motion along two perpendicularly related axes, one longitudinal, the other transverse. A typical cyclical sequence for progressively advancing workpieces involves a longitudinal transfer stroke for advancing each workpiece longitudinally from one machining station to the next, a transverse retraction stroke for releasing the workpieces at their new stations, a longitudinal return stroke to prepare for the next transfer, and a transverse extension stroke to once again engage the workpieces for the next longitudinal transfer stroke. This rectilinear cycle is repeatedly executed whereby workpieces are progressively advanced through successive machining operations.

Typically, the longitudinal motion axis is horizontal while the transverse motion axis is either horizontal or vertical. In the case of a vertical transverse motion axis the work transfer device may be of a type commonly referred to as a walking beam transfer device. The walking beam comprises a horizontal beam which spans the length of the series path and on which workpiece engaging members are mounted at uniform longitudinal spacings. The walking beam repeatedly executes the above described closed loop operating cycle to progressively advance the workpieces from station to station.

In prior work transfer devices of this type, motion for each axis is derived from a rotary cam, such as a barrel cam. The cams are driven from a prime mover such as an electric or hydraulic drive. Followers are engaged with the cams and operably coupled with the walking beam via appropriate mechanisms to impart the desired rectilinear motion to the workpiece engaging members. Typically, the cams are rotated in unison from a common prime mover and the phasing between cams is such as to impart the desired rectilinear motion to the workpiece engaging members.

In the case of a lift and carry type transfer, which would be executed by a walking beam type device, one cam controls the horizontal longitudinal motion while the other cam controls the vertical transverse motion. Where both cams are barrel cams mounted on a common shaft the shaft may be arranged parallel to one of the two motion axes, say for example the horizontal longitudinal axis. The throw, or profile, of the horizontal cam is therefore also longitudinal, and the mechanism for coupling the horizontal cam with the walking beam to impart horizontal longitudinal motion to the walking beam is not especially complex. Such a mechanism may simply be a longitudinally shiftable carriage having a cam follower following the horizontal cam profile. Such a mechanism will, for a given cam profile, possess a fixed longitudinal stroke corresponding exactly to the throw of the cam. Alternatively, other mechanisms may be used to provide adjustable stroke length.

However, the throw of the vertical cam is also horizontal. Consequently a more complex mechanism is required in order to couple the vertical cam with the walking beam to effect vertical stroking. One prior mechanism comprises a bellcrank to transform the horizontal throw or profile of the vertical cam into vertical motion of the walking beam. For this purpose the bell crank is mounted on the work transfer device for rocking motion about a pivot axis. One arm of the bellcrank is coupled to the vertical cam while the other arm is arranged at an angle to the first arm. The bellcrank converts the generally horizontal rocking motion of the first arm into generally vertical rocking motion of the second arm. Because the walking beam must move vertically at both the beginning and at the end of the longitudinal stroke it is necessary for the coupling between the second crank arm and the walking beam to accommodate the full longitudinal stroke imparted to the walking beam by the horizontal cam.

One previous construction for accomplishing this involves a horizontal track which is bodily shifted longitudinally with longitudinal stroking of the walking beam. The track is also bodily shiftable vertically, and the walking beam is vertically supported on the track. The second crank arm of the bellcrank comprises a roller which rides in the track. The track is long enough that the roller remains in the track throughout the full longitudinal stroke. When the walking beam is at either end of its longitudinal stroke, the vertical cam is effective to rock the bellcrank which in turn via the engagement of the roller with the track is effective to impart the corresponding vertical transverse motion to the track, and hence also to the walking beam.

This prior construction possesses a number of disadvantages. One disadvantage is that the track shifts longitudinally with the longitudinal stroke and hence, the overall longitudinal dimension for the device must accommodate both the longitudinal stroke plus the length of the track. This can impose constraints on the layout of the automated line resulting in undesirable inefficiencies.

Another disadvantage is that the weight carrying capacity is limited due to the requirement that the bellcrank be capable of supporting the weight at both ends of the longitudinal stroke. Because the moment acting about the pivot axis of the bellcrank due to the combined weights of the walking beam and workpieces is greater when the walking beam is at one end of its longitudinal stroke than at the other end the weight carrying capacity is established when the walking beam is at that one end. Obviously, this is less than the weight carrying capacity that would be obtained if the moment with the beam at one end were the same as the moment with the beam at the other end.

Prior walking beam mechanisms present a problem where a relatively long transfer stroke is involved, say 16 inches or more, or where the overall length of the transfer line is relatively long. There may arise a need for a plurality of cam operated transfer devices, and these can involve higher cost, larger space requirements, and more complicated adjustment. It becomes difficult to synchronize the devices so as to produce the desired simultaneous transfer of workpieces from station to station.

The above cross referenced patent application discloses an invention which overcomes these disadvantages of prior work transfer devices.

The invention of this application provides a new and improved work transfer device which also overcomes the foregoing disadvantages of prior work transfer devices. With the present invention the overall longitudinal dimension of such a work transfer device can more closely correspond to the length of the longitudinal transfer stroke. This yields greater efficiencies in the layout and operation of an automated line using the invention in association therewith. Furthermore, the invention avoids the weight carrying limitations inherent in prior work transfer devices of the type described above. The invention is particularly well suited for walking beam type transfer devices although its principles are not limited to that specific type. The invention provides a more efficient arrangement of component parts within the work transfer device. It also can provide the capability for slaving additional work transfer devices to a master device without the problem of having to synchronize cams of one device to those of other devices, as disclosed in the above cross referenced patent application.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time for carrying out the invention.

DESCRIPTION OF THE PREFERRED EMBODIMENT

Figures 1, 1A:
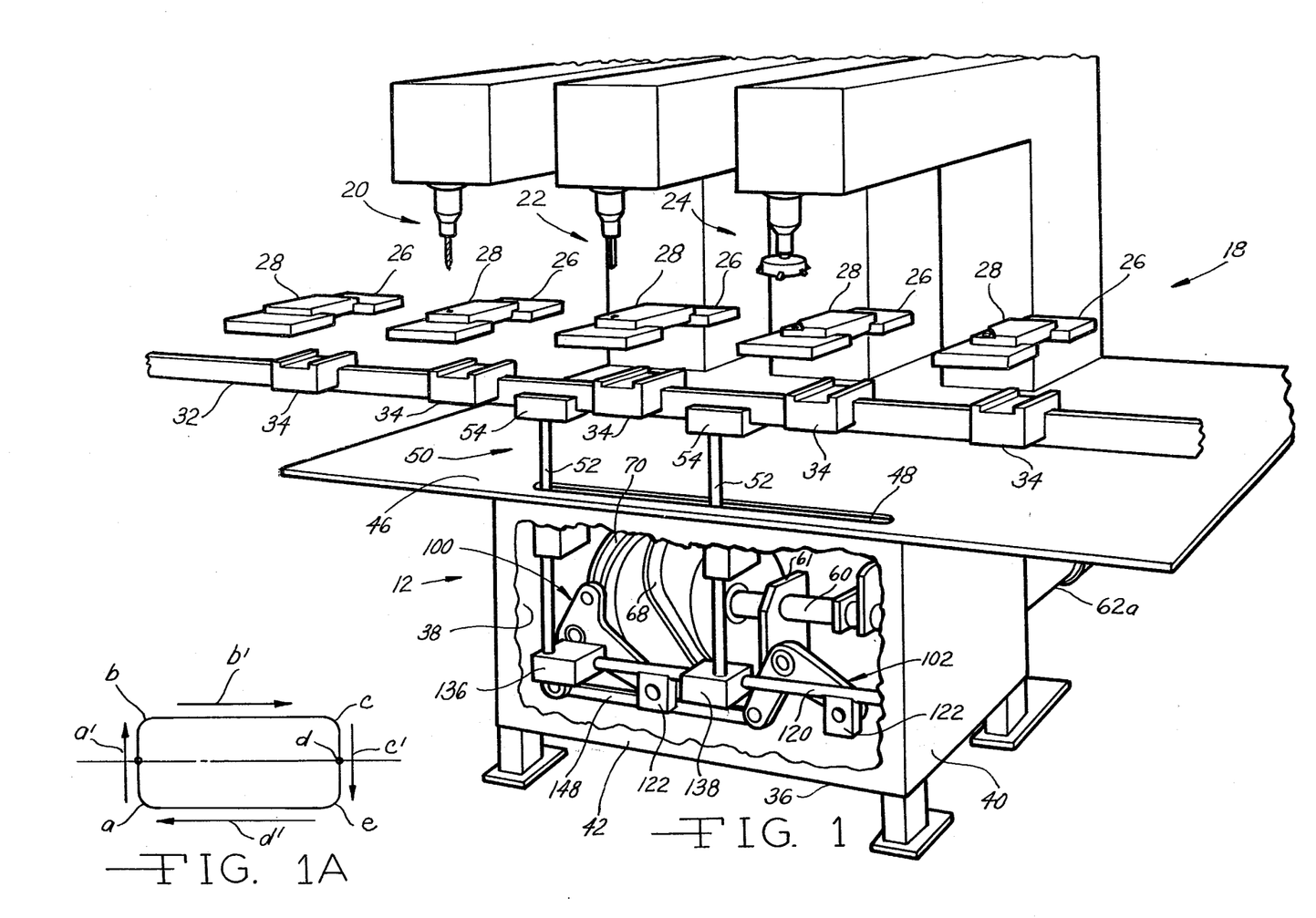
FIG. 1 is a perspective view, having portions removed, of a work transfer device embodying principles of the present invention and shown in use in an automatic machining installation for advancing workpieces between successive machining stations.
FIG. 1A is a diagram illustrating the motion executed by the work transfer device of FIG. 1.

FIG. 1 shows a work transfer device 12 embodying principles of the present invention in association with an automated machining line 18 having three machining stations 20, 22 and 24. Each machining station includes a work station 26 at which workpeices 28 are machined. Detail of each work station 26 is omitted from the drawing in the interest of clarity. Briefly, each such work station comprises a locating jig or fixture for accurately locating a workpiece in relation to the corresponding machining device. If necessary, various types of hold down and locating devices, such as pneumatic, hydraulic, or electrically actuated clamps and alignment pins, may be used to secure and accurately position the workpieces in the fixtures for machining operations. The work stations are uniformly equally spaced in the horizontal longitudinal direction. There may also be additional stations at the entrance and exit of the machining line, as shown.

In operation of the machining line 18 each machining station 20, 22, 24 simultaneously performs an operation on the workpiece 28 which is located at the corresponding work station 26. Upon completion of the respective machining operations the workpieces are simultaneously transferred with each workpiece being advanced one work station. The machining operations are once again conducted and in this way workpieces are successively machined by the stations 20, 22, 24 as they pass along the line.

Work transfer device 12 is effective to transfer the workpieces by executing a closed rectilinear path of motion as indicated in FIG. 1A. In the illustrated embodiment of the invention the actual transfer is accomplished by means of a walking beam type transfer bar 32. Work holders 34 are mounted on beam 32 at locations corresponding to the spacing between the work stations 26. The device 12 imparts the rectilinear motion to the walking beam and hence to the individual work holders.

FIG. 1 illustrates the walking beam in a position corresponding to the position identified by the letter a in FIG. 1A. This is the beginning of the transverse vertical extension stroke identified by the arrow a'. As the work transfer device executes the transverse extension stroke, the walking beam is elevated. During the transverse extension stroke, the beam is in the longitudinally retracted, or return, position. As the beam elevates, the work holders 34 engage the corresponding workpieces 28 lifting them from the work stations 26. This may occur near the midpoint of the stroke. As the cycle reaches the point indicated by the letter b, the lifting motion ceases, and the beam is shifted longitudinally forward in the direction identified by the arrow b'. The horizontal stroke corresponds to the longitudinal spacing between work stations 26 so that when the point indicated by the letter c is reached, each workpiece 28 is directly over the next work station 26. Now the beam begins the transverse retraction stroke identified by the arrow c' depositing each workpiece 28 on the new work station 26 in the vicinity of midstroke indicated by the letter d. From there the beam continues to retract so as to clear the work stations and when the point designated by the letter e is reached, the downward motion ceases. The beam is then longitudinally returned along the path indicated by the arrow d'. When the point indicated by the letter a is reached again, the return stroke ceases, and the next vertical extension stroke begins. Thus it can be perceived that the walking beam executes a closed rectilinear motion path. It will be appreciated, however, that the path of travel may not be exactly rectangular; by way of illustration the rounded corners shown in FIG. 1A of the motion diagram indicate a certain amount of overlap between the vertical and horizontal motions when a transition occurs between them.

Once the workpieces have been advanced to their new stations there may occur a clamping or alignment of the workpieces at the work stations preparatory to the actual machining operations. In order to optimize efficiency in operation of the line, these operations on the workpiece are conducted as soon as the transfer bar has vertically retracted. Depending upon the cycle time of the machines, the work transfer device may or may not be continuously cycled.

The means by which the walking beam is caused to execute its rectilinear motion can be seen by consideration of the detailed construction shown in FIGS. 2 through 6. The work transfer device has a generally rectangular overall configuration comprising a base 36, end walls 38, 40, side walls 42, 44 and a top wall 46. A longitudinal slot 48 is provided in top wall 46 adjacent side wall 42. A beam support 50 extends through slot 48 from the inside of unit 12 to support the walking beam. The illustrated construction for beam support 50 comprises a pair of vertical rods 52 having circular cross sections which pass through slot 48. The walking beam is suitably secured to rectangular attaching plates 54 at the upper ends of rods 52.

Figure 2:
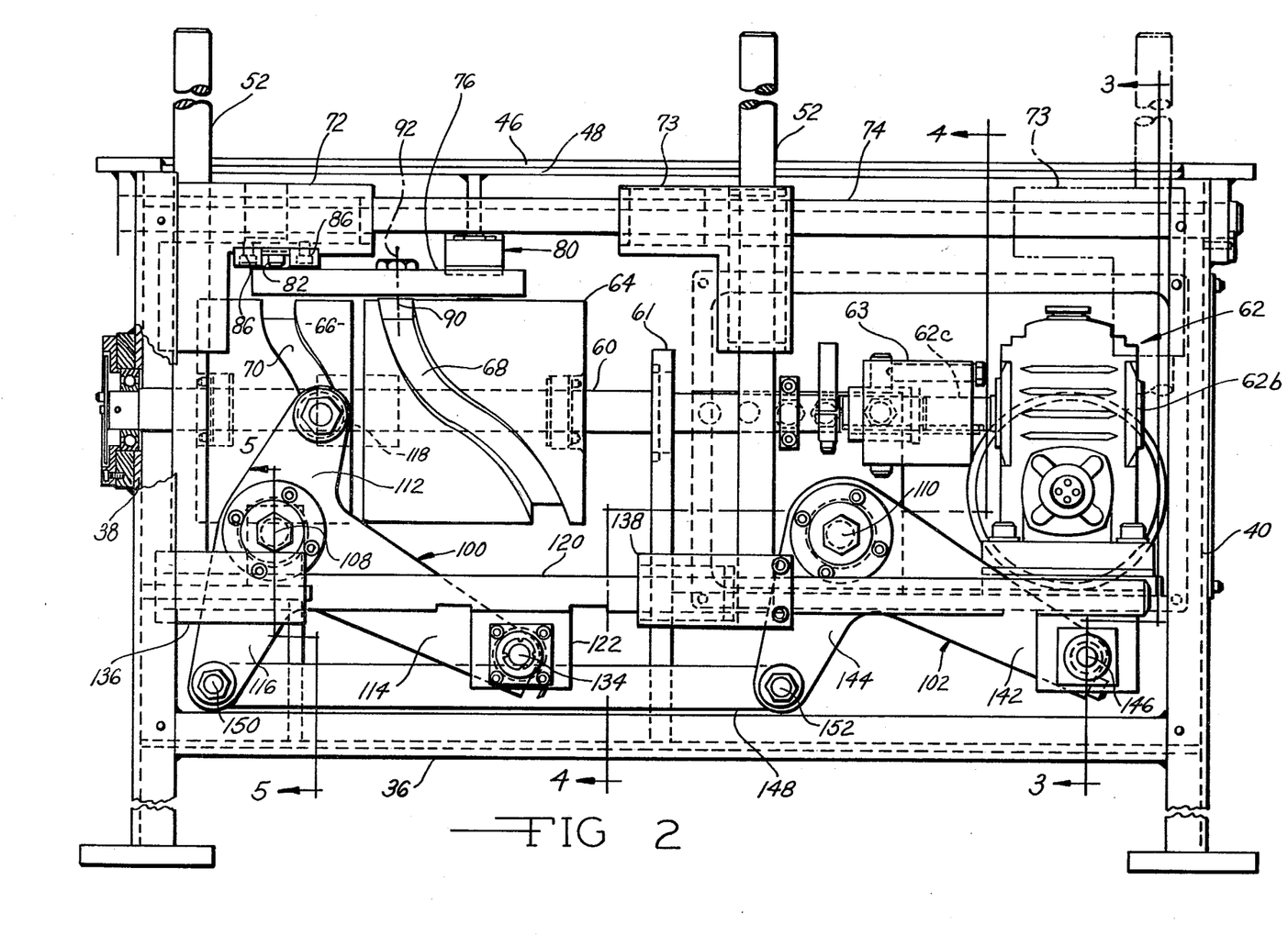
FIG. 2 is a front elevational view, having a portion broken away, of the work transfer device of FIG. 1.

The internal construction of the work transfer device comprises a drive shaft 60 which is arranged horizontally longitudinally within the unit. The left hand end of drive shaft 60, as viewed in FIGS. 1 and 2, is suitably journaled on the left hand end wall 38. The right hand end of the drive shaft is suitably journaled on a vertical support plate 61 located toward the middle of the unit.

Affixed to drive shaft 60 are a pair of barrel cams 64 and 66 respectively. Barrel cam 64 is located adjacent support plate 61 while barrel cam 66 is adjacent end wall 38. As will become more apparent, barrel cam 64 controls the horizontal longitudinal motion of the walking beam while barrel cam 66 controls the vertical motion. They will be referred to as the horizontal cam and the vertical cam respectively.

Drive shaft 60 and the two cams are driven by means of a drive designated generally by the reference numeral 62. The drive is located within the unit toward the right hand end as viewed in FIG. 2. The specific drive 62 comprises a variable speed motor 62a and a reducing mechanism 62b. Reducing mechanism includes an output shaft 62c. This output shaft is coupled through an overload disconnect device 63 to drive shaft 60. Under usual operating conditions the overload disconnect device provides a direct coupling of output shaft 62c to drive shaft 60. This means that when motor 62 operates, shaft 60 and the two cams 64 and 66 rotate. The reducing mechanism 62b provides a suitable gear reduction for driving the cams at a suitable speed for operating the work transfer device. If an overload condition is encountered by the work transfer device, the overload disconnect device 63 is effective to disconnect the drive from the drive shaft thereby avoiding damage to the reducer and drive motor.

The horizontal cam comprises an endless grooved cam 68 which is profiled to produce the desired longitudinal stroking of the walking beam in accordance with the rectilinear operating cycle. The vertical cam has an endless grooved cam 70 which is profiled to produce the desired vertical stroking of the walking in accordance with the operating cycle.

The cylindrical rods 52 of beam support 50 are suitably journaled for vertical shifting. The left hand rod 52, as viewed in FIGS. 1 and 2, is journaled on a carriage 72 within the work transfer device while the right hand rod 52 is journaled on a carriage 73. Both carriages 72, 73 are in turn longitudinally shiftable in the horizontal direction along a common circular cylindrical guide rod 74 which extends horizontally between the end walls 38 and 40. The guide rod is located laterally within the unit between the barrel cams and the near side wall 42.

Figure 3:
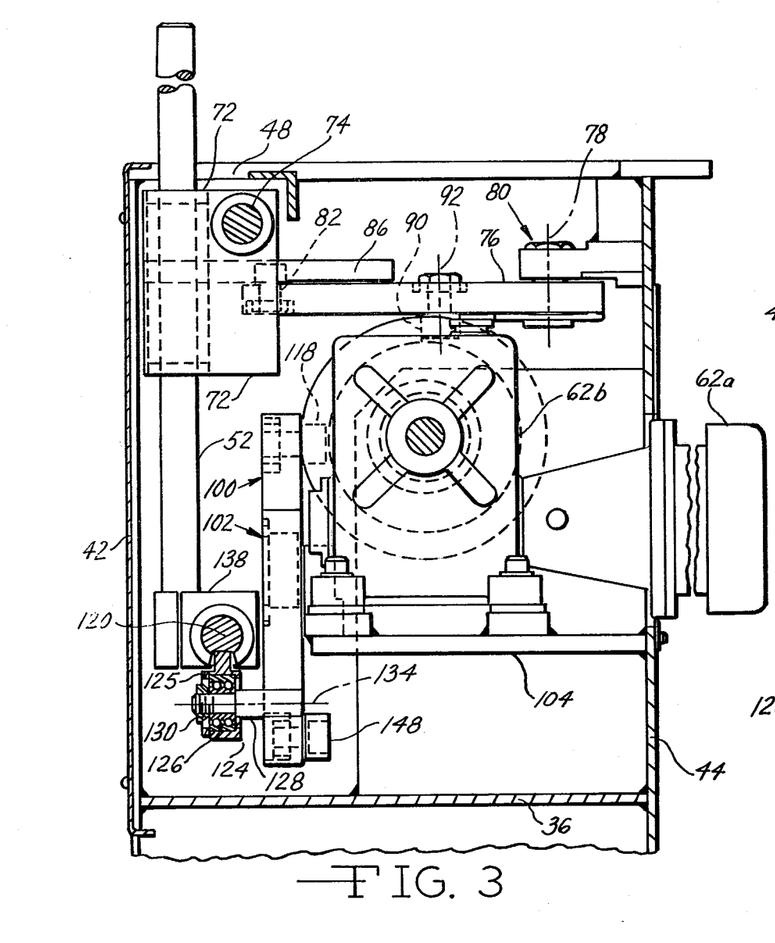
FIG. 3 is a vertical sectional view taken in the direction of arrows 3—3 in FIG. 2.
Figures 4, 5:
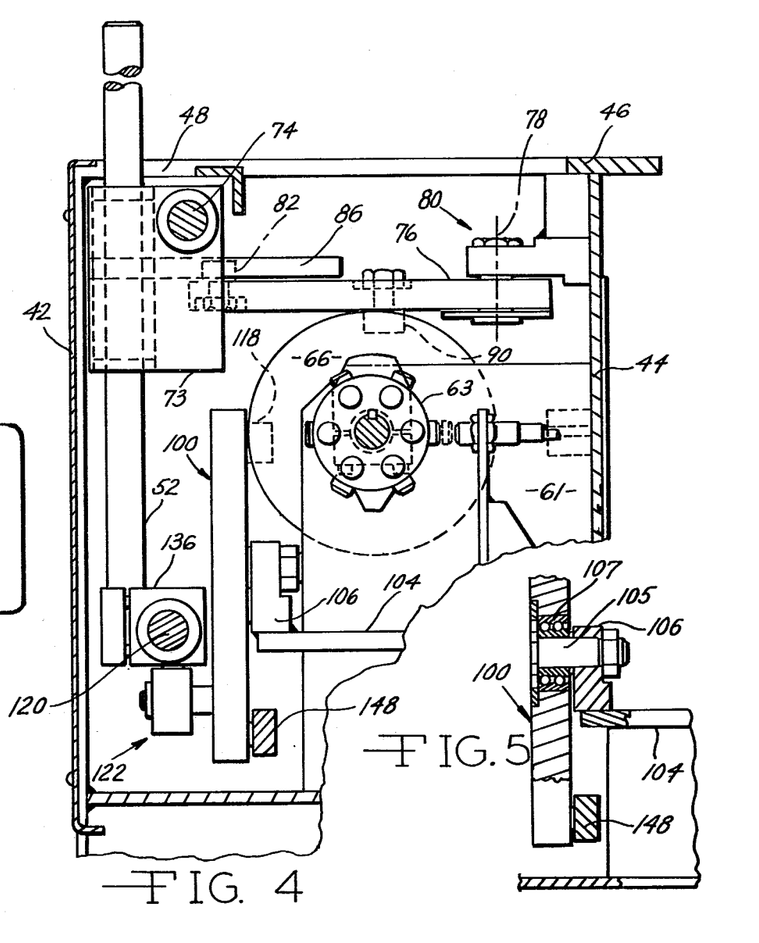
FIG. 4 is an fragmentary vertical sectional view taken in the direction of arrows 4—4 in FIG. 2.
FIG. 5 is a fragmentary sectional view taken in the direction of arrows 5—5 in FIG. 2.

Horizontal motion for shifting carriages 72, 73 longitudinally on guide rod 74 is imparted from horizontal cam 64 by means of a lever arm 76 which is located above cam 64 just below top wall 46. Lever arm 76 is disposed generally horizontally and is pitovally mounted at one end about a vertical pivot axis 78. For this purpose the lever arm is pivoted on a suitable pivot joint 80 which is secured to the far side wall 44 as can be seen in FIGS. 3 and 4. The opposite end of lever arm 76 is operatively connected with carriage 72 by means of a roller and track connection.

For this purpose a circular roller 82 is mounted on the top side of the lever arm. A lateral track 84 is defined on the underside of carriage 72 by a pair of longitudinally spaced parallel members 86 secured to the carriage. As can be seen in FIGS. 3 and 4 the members 86 project laterally on the far side of the carriage toward the far side wall 44. Roller 82 is free to rotate about a vertical axis 88 and fits closely within the track. If lever arm 76 is caused to swing about axis 78 in the direction of the arrow 87 in FIG. 6, there occurs a corresponding longitudinal shifting of the carriage 72 along guide 74, roller 82 traveling within track 84 during the stroking. This shifting is also imparted to the left hand support rod 52 by walking beam 32 tying the two rods 52 together so that the horizontal shifting motion imparted to carriage 72 and left hand rod 52 by the lever arm 76 is also imparted to carriage 73 via the right hand rod 52. Hence, the longitudinal stroke involves both carriages 72 and 73 shifting in unison.

Figure 6:
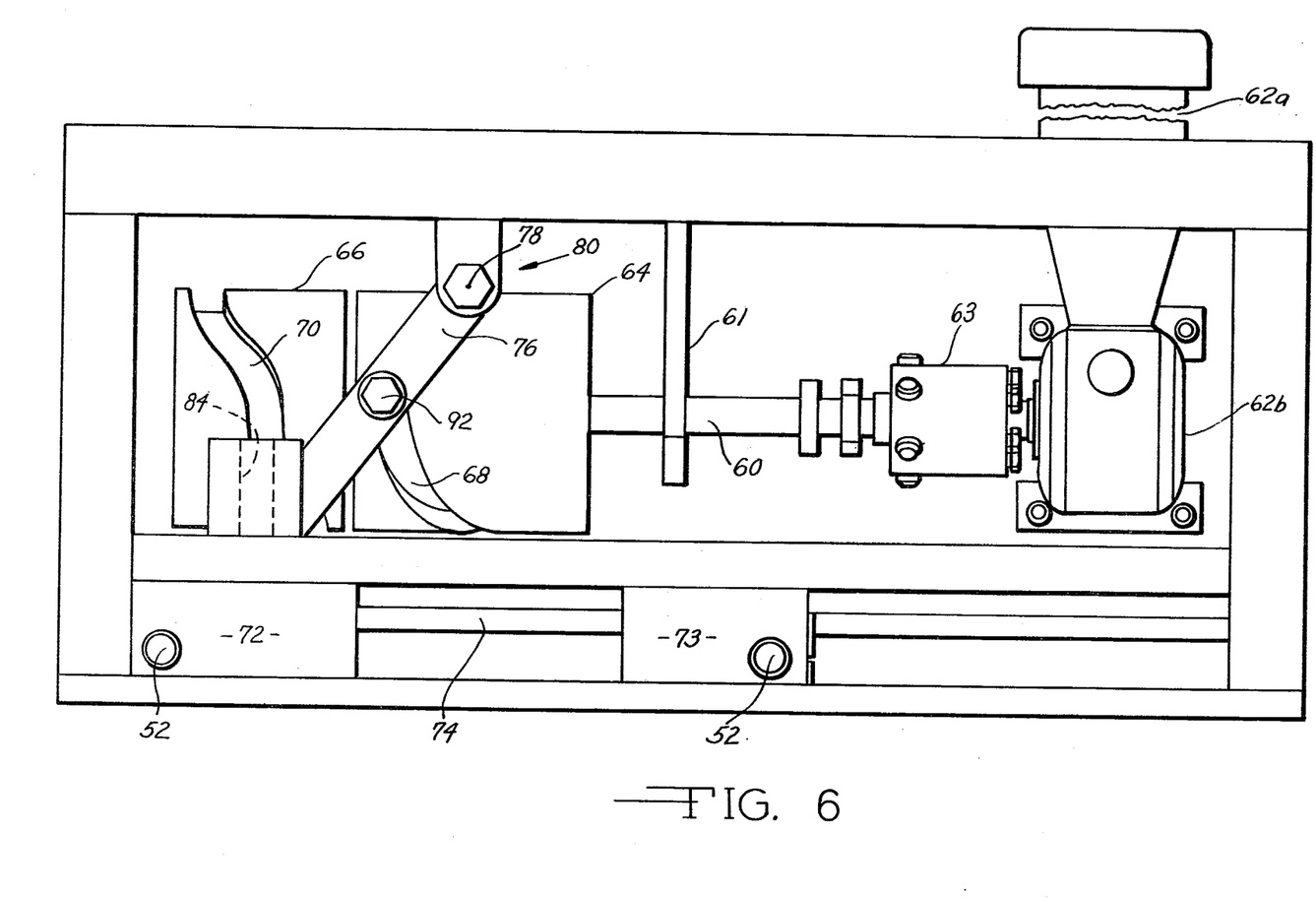
FIG. 6 is a top plan view of FIG. 2, having portions broken away.

Lever arm 76 is operated via a cam follower 90 operatively coupling cam 64 with the lever arm. Follower 90 is mounted on lever arm 76 between pivot joint 80 and carriage 72. The follower comprises a roller which is free to rotate on the lever arm about a vertical axis 92. The roller rides in the cam groove. Hence, as cam 64 rotates the profile of the cam groove is tracked by follower 90 to impart a pivotal motion to the lever arm about axis 78. The pivotal motion imparted to the lever via the follower causes carriages 72 and 73 to be correspondingly longitudinally shifted along guide rod 74. Motion of the lever arm 76 is such that the forward longitudinal stroke of the walking beam is caused by the lever arm swinging from left to right as viewed in FIG. 6. FIG. 6 illustrates the carriages and the transfer bar in the longitudinal return position. The arrangement is such that there is a multiplication of the throw, of profile, of the horizontal cam groove whereby the carriages are shifted longitudinally a distance greater than the actual profile of the cam groove. The cam groove has a profile which will create the desired corresponding longitudinal shifting of the walking beam in accordance with the motion diagram of FIG. 1A.

The work transfer device includes additional mechanism for coupling vertical cam 66 to walking beam 32 for imparting vertical motion to the walking beam. This mechanism comprises a pair of cranks 100, 102. A horizontal ledge 104 (FIGS. 3 and 4) is supported within the work transfer device on the far sidewall at a level vertically above base 36. Blocks 106 mount on ledge 104 at longitudinally spaced locations along the free longitudinal edge of the ledge as viewed in FIGS. 3 and 4. Each crank 100, 102 is supported on a corresponding one of the blocks so that it can pivot about a horizontal transverse axis. The axis about which crank 100 pivots is designated by the reference numeral 108 while that for crank 102 is designated by the reference numeral 110.

FIG. 5 illustrates detail of the pivot joint. A pin 105 is attached to block 106 and projects laterally horizontally. A bearing assembly 107 supports the crank on the pin. Preferably, the bearing assembly is of the type comprising a double row of balls.

Crank 100 comprises three crank arms 112, 114, 116. Crank 112 has a circular roller 118 at its distal end which fits in groove 70 of cam 66. The distal end of arm 114 is connected via a pivot joint with a cylindrical guide rod 120 of circular cross section. Guide rod 120 is arranged horizontally longitudinally and is parallel to guide rod 74 and hence parallel to the direction of carriage travel.

The particular construction for the pivot joint connection from crank arm 114 to guide rod 120 comprises a generally rectangular bearing block 122 which is secured to guide rod 120. Guide rod 120 is machined locally on its underside to provide a slot in which the bearing block 122 is fitted. The bearing block is secured to the guide rod by suitable attaching means such as screws. As best seen in FIG. 3, the bearing block comprises a main body 124 in which a bearing assembly 126 is located. The bearing assembly is retained by means of a retainer 125. The bearing 126 is of the type which comprises a double row of spherical bearing balls which are contained between inner and outer annular members. A pin 128 affixed to crank arm 114 projects horizontally from the crank arm and passes through bearing assembly 126. A nut 130 is attached to the threaded shank of the pin to complete the coupling. With this arrangement the crank arm can pivot freely about the horizontal pivot axis 134.

Engaging guide rod 120 are a pair of longitudinally spaced slides 136, 138 respectively. The lower end of the left hand rod 52 is secured to slide 136 while the right hand rod 52 is secured to slide 138. Therefore, the slides are shiftable longitudinally along guide rod 120 in unison with the longitudinal shifting of the carriages.

Crank arm 102 is pivoted on the corresponding block 104 in the same manner as crank arm 100 on its block 104. The crank arm 102 has a pair of arms 142, 144 which are angularly related to each other in the same manner as are crank arms 114, 116 of crank 100. The distal end of crank arm 142 is operably connected with guide rod 120 by the same type of pivot arrangement as crank arm 114 was coupled to the guide rod. Hence, the crank arm 142 is pivotable with respect to the guide rod about a horizontal transverse pivot axis 146.

The distal ends of crank arms 116, 144 are connected together by means of a drag link 148. The connections of the crank arms to the drag link provide for relative pivotal movement about horizontal pivot axis 150, 152 respectively.

With this arrangement rotation of vertical cam 66 rocks crank arm 100 about axis 108. The connection provided by drag link 148 acting between the crank arms 116 and 144 causes crank 102 to rock in unison with crank 100. While the respective crank arms swing along circular arcs, the geometric relationships are such that crank arm 112 experiences a predominately horizontal component of motion as cam 66 rotates. This horizontal component of motion is translated into corresponding vertical motion of crank arms 114, 142. Accordingly, guide rod 120 is bodily displaced vertically in accordance with operation of the two cranks to impart transverse stroking motion to the walking beam. The cam groove 70 is suitably profiled to generate the proper rocking action of the cranks so that the walking beam is transversely shifted at the proper times in the motion cycle represented by FIG. 1A.

It will be observed that the guide rod 120 experiences only a limited horizontal component of motion while being vertically shifted. Accordingly, this means that the overall length of the work transfer unit is essentially determined by the longitudinal stroke considerations. This can yield efficiencies in the layout and operation of an associated machining line. Another advantage is that the double crank arrangement allows for an increase in weight carrying capacity because support is provided at two longitudinally spaced locations. A still further advantage is that the disclosed construction provides economies in material and assembly while at the same time an efficient compact unit results.

In view of the foregoing description the overall operation of the work transfer device may be summarized as follows. The drawing FIGS. 1 through 6 show the work transfer device at the point of its operating cycle corresponding to the point designated by the letter a in the motion diagram of FIG. 1A. This would constitute the end of the longitudinal return stroke and the beginning of the transverse vertical extension stroke. Hence, as the device operates, the two carriages 72 and 73 remain in their far left positions of travel as shown in the drawing figures. As the vertical extension stroke is being executed, the two crank arms pivot in the counterclockwise sense as viewed in FIG. 2 producing a corresponding upward motion of guide rod 120 and hence of the walking beam. At the conclusion of the vertical extension stroke the cranks are at their full counterclockwise limits of pivoting and guide bar 120 at its maximum vertical elevation above the base 36. At all times however, guide rod 120 remains horizontally longitudinally disposed so as to be parallel to the direction of carriage travel. During the transverse extension stroke the work holders 34 engage the work pieces to lift them from the work stations 26. At the conclusion of the vertical extension stroke the work pieces are clear from their respective work stations so that the longitudinal forward transfer can proceed.

As the forward longitudinal transfer stroke (indicated by the arrow b' in FIG. 1A) begins, guide rod 120 remains in its uppermost position. Horizontal cam 64 is now effective to pivot lever arm 76 in the counterclockwise sense as viewed in FIG. 6 to advance carriages 72, 73 to the right. As the carriages shift forward over the forward transfer stroke, work pieces are being advanced to the next station. When the lever has been swung to its counterclockwise limit of travel, the carriages are at their full right hand limit of travel. For carriage 73 this position is represented by the broken line position of carriage 73 in FIG. 2. At this point of the cycle each work piece 28 is directly over the work station 26 on which it is to be located.

The carriages remain in the forward position while vertical cam 66 now becomes effective to lower the walking beam as indicated by the arrow c' in FIG. 1A. This represents the vertical transverse retraction stroke and is accomplished by the vertical cam profile causing the cranks to rock in the clockwise sense as viewed in FIG. 2. Because guide rod 120 is supported both in the vicinity of its midpoint as well as near its far right hand end, the combined weight of the walking beam, the beam support and the work pieces is more uniformly supported on the work transfer device promoting better performance and operation. As the transverse retraction stroke is executed, the work pieces are deposited at their new work stations after which the walking beam continues vertically to clear the work pieces and work stations in anticipation of the longitudinal return stroke. At the conclusion of the vertical retraction stroke the cranks have been pivoted to their clockwise limit and guide rod 120 is at its lowermost position.

As the longitudinal return stroke begins, horizontal cam 64 is effective to pivot lever arm 76 in the clockwise sense as viewed in FIG. 6. This results in corresponding longitudinal shifting of carriages 72, 73 to the left. Once the carriages have been shifted to the far left position, the longitudinal return stroke is complete thereby concluding a complete operating cycle of the work transfer device.

The arrangement of the cranks and drag link define a parallelogram linkage wherein the parallelogram is defined by the pivot axes 108, 110, 150, 152. The parallelogram linkage will ensure that the guide rod 120 is always maintained in a horizontal longitudinal orientation even when it is being displaced vertically. The double crank arrangement provides improved vertical support and weight carrying capacity and results in better operation.

The actual velocity of motion which is imparted to the walking beam in both horizontal and vertical directions is a function of the detailed construction of the mechanism and particularly of the profiles of the respective cams and the drive speed. The cams may be designed in accordance with conventional techniques to impart suitable velocities to parts of the mechanism during transfer. It may be desirble to provide profiles which cause minimum accelerations and decelerations during engagement and releasing of the work pieces by the walking beam. Such features can be incorporated using conventional design practices.

From the foregoing description it can be seen that a new and improved construction for a work transfer device has been disclosed. Construction of the preferred embodiment is particularly compact and well suited to promote efficiency in layout and operation of an automated line. While use of lever arm 76 for imparting horizontal to the carriages from the horizontal cam has been disclosed, it will be appreciated that other arrangements for coupling the horizontal cam to the carriages may be employed in mechanisms embodying principles of the invention. Compactness is also promoted by arranging the two cam followers engaging the horizontal and vertical cams so that they engage their respective cams at locations which are angularly circumferentially spaced relative to the axis of drive shaft 60. In the disclosed embodiment the two followers are at 90° circumferential spacing with respect to each other. With the vertical motion mechanism at one side of the cams an efficient arrangement of the internal components of the mechanism results. In addition to the efficient arrangement of the component parts of the mechanism, improved performance and operating capability are also obtained. There are the further advantages of a less complicated procedure for assembling the work transfer device and of economy in the amount of material and number and design of component parts. It will be noted that the mechanism utilizes cylindrical rods for the horizontal and vertical guides. The carriages and slides can be readily economically fabricated. Desirably, the engagement between the rods and the carriages and slides uses suitable guide bushings or similar devices promoting free sliding motion between parts. Furthermore, because the mass of the slides, carriages, and guide rods is low, power requirements are reduced. The invention is well suited for use in automation lines such as the example described herein. While the invention has been disclosed in this application in association with an automated machining line, the invention may be used with other automated lines such as automated assembly machine lines, automated gauging machine lines, and automated testing machine lines. While a preferred embodiment has been disclosed, it will be appreciated that principles of the invention, as set forth in the following claims, are applicable to other embodiments.

I claim:

1. In a work transfer defice for progressively transferring articles to successive stations having a base on which a carriage means is longitudinally shiftable, work engaging means movable longitudinally with the carriage means while being shiftably mounted on the carriage means for transverse shiftable movement with respect to the carriage means, drive means for shifting the carriage means longitudinally of the base and for shifting the work engaging means transversely of the carriage so as to cause the work engaging means to execute a generally rectilinear path of movement for progressively transferring articles between successive stations, the improvement for imparting transverse motion to the work engaging means wherein there is provided a cylindrical guide rod parallel to the direction of carriage travel, a pair of longitudinally spaced slides which are longitudinally shiftable on the guide rod, means securing each slide to the work engaging means, a pair of bellcranks spaced longitudinally apart, means mounting the bellcranks on the base about respective longitudinally spaced pivot axes, a pair of pivot blocks secured to the guide rod at longitudinally spaced locations, each bellcrank having a crank arm connected at the distal end to a corresponding one of the pivot blocks whereby a pivot connection is provided between each crank arm and the corresponding pivot block, each bellcrank comprising a second crank arm, a drag link connecting both second crank arms together so that rocking motion of one crank arm about its pivot axis is imparted to the other crank arm and means operably coupling the two crank arms to the drive means for causing the crank arms to operate in unison to transversely displace the guide rod and thereby impart transverse motion to the work engaging means.

2. A work transfer device as set forth in claim 1 wherein one of said two bellcranks comprises a third crank arm, said third crank arm being operably connected to the drive means for effecting transverse motion of the work engaging means.

3. A work transfer device as set forth in claim 1 wherein the drag link is parallel to the guide rod.

4. A work transfer device as set forth in claim 1 wherein one bellcrank has its pivot axis located near one end of the guide rod and the other bellcrank has its pivot axis located near the middle of the guide rod.

5. A work transfer device as set forth in claim 1 wherein the drag link is disposed at a level vertically below that of the guide rod for all operative positions of the guide rod.

6. A work transfer device as set forth in claim 1 wherein the work engaging means comprises a pair of transversely disposed rods each of which is secured to a corresponding one of the two slides on the guide rod and the carriage means comprises two separate carriage members longitudinally spaced apart on a longitudinal guide rod, each of said transversely disposed rods being guided for transverse shiftable motion on a corresponding one of the two carriage members.

7. A work transfer device as set forth in claim 1 wherein the drive means comprises a drive shaft, a pair of cams on the drive shaft, means operably coupling one of said bellcranks with one of said cams whereby that cam imparts transverse motion to the work engaging means, the other cam being operatively coupled with the carriage means to impart longitudinal motion to the carriage means.

8. A work transfer device as set forth in claim 7 wherein the two crank arms are supported above the base on a ledge which is disposed at a vertical level below that of the two cams.

9. A work transfer device as set forth in claim 8 wherein at least a portion of the drive means is also supported on the ledge.

10. A work transfer device as set forth in claim 1 wherein the longitudinal component of displacement which occurs when the guide rod is bodily displaced by the pair of bellcranks is relatively small in comparison to the vertical component of displacement.

11. A work transfer device as set forth in claim 7 wherein the drive means for the carriage includes a follower which engages the corresponding cam at a location which is circumferentially spaced about the axis of the drive shaft from the location at which a follower of one of the bellcranks engages the other cam.

12. A work transfer device as set forth in claim 1 wherein each pivot block comprises a main body member, a bearing assembly within the main body member, the distal end of the corresponding crank arm comprising a pin which engages the bearing assembly, the bearing assembly providing the pivotal action between the crank arm and the guide rod.

13. In a work transfer device for progressively transferring articles to successive stations having a base on which a carriage means is longitudinally shiftable, work engaging means movable longitudinally with the carriage means while being shiftably mounted on the carriage means for transverse shiftable movement with respect to the carriage means, drive means for shifting the carriage means longitudinally of the base and for shifting the work engaging means transversely of the carriage means so as to cause the work engaging means to execute a movement for progressively transferring articles between successive stations, the improvement for imparting transverse motion to the work engaging means wherein there is provided a cylindrical guide rod parallel to the direction of carriage means travel, a pair of longitudinally spaced slides which are longitudinally shiftable on the guide rod, means securing each slide to the work engaging means, a pair of bellcranks spaced longitudinally apart, means mounting the bellcranks on the base about respective longitudinally spaced pivot axes, a pair of pivot blocks secured to the guide rod at longitudinally spaced locations, each bellcrank having a crank arm connected at the distal end to a corresponding one of the pivot blocks whereby a pivot connection is provided between each crank arm and the corresponding pivot block, each bellcrank comprising a second crank arm, a drag link connecting both second crank arms together so that rocking motion of one crank arm about its pivot axis is imparted to the other crank arm and means operably coupling the two crank arms to the drive means for causing the crank arms to operate in unison to transversely displace the guide rod and thereby impart transverse motion to the work engaging means.

14. The improvement set forth in claim 13 in which the work transfer device is constructed and arranged such that the longitudinal travel of said carriage means is horizontal and the transverse travel of the work engaging means on the carriage means is vertical.

* * * * *